(12) United States Patent
Boyapalle et al.

(10) Patent No.: US 11,481,497 B2
(45) Date of Patent: Oct. 25, 2022

(54) SYSTEMS AND METHODS FOR HARDWARE ATTESTATION IN AN INFORMATION HANDLING SYSTEM

(71) Applicant: Dell Products L.P., Round Rock, TX (US)

(72) Inventors: Anantha K. Boyapalle, Cedar Park, TX (US); Charles D. Robison, Buford, GA (US); Amy C. Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/018,416

(22) Filed: Sep. 11, 2020

(65) Prior Publication Data

US 2022/0083664 A1 Mar. 17, 2022

(51) Int. Cl.
G06F 21/57 (2013.01)
H04L 9/40 (2022.01)
G06F 21/55 (2013.01)
G06F 21/72 (2013.01)

(52) U.S. Cl.
CPC .......... *G06F 21/572* (2013.01); *G06F 21/554* (2013.01); *G06F 21/72* (2013.01); *H04L 63/0823* (2013.01)

(58) Field of Classification Search
CPC ...... G06F 21/572; G06F 21/554; G06F 21/72; H04L 63/0823; H04L 63/0876; H04L 63/1466; H04L 63/123
See application file for complete search history.

(56) References Cited

U.S. PATENT DOCUMENTS

| | | | |
|---|---|---|---|
| 9,659,171 B2 | 5/2017 | Treweek et al. | |
| 10,397,005 B2* | 8/2019 | Brickell | H04L 9/006 |
| 10,977,367 B1* | 4/2021 | Adler | G06F 21/568 |
| 2020/0026858 A1* | 1/2020 | Subramanian | G06F 21/64 |
| 2021/0011984 A1* | 1/2021 | Renke | G06F 21/552 |
| 2021/0044575 A1* | 2/2021 | Kong | H04L 9/3247 |
| 2021/0232688 A1* | 7/2021 | Luciani | G06F 21/57 |
| 2021/0266184 A1 | 8/2021 | Robison et al. | |
| 2021/0373903 A1 | 12/2021 | Nelson et al. | |
| 2022/0188462 A1* | 6/2022 | Moore | H04L 9/3236 |

* cited by examiner

*Primary Examiner* — Christopher A Revak
(74) *Attorney, Agent, or Firm* — Jackson Walker L.L.P.

(57) ABSTRACT

A method may include, during execution of a basic input/output system comprising boot firmware configured to be the first code executed by the processor when the information handling system is booted and/or powered on and execute prior to execution of an operating system of the information handling system, executing a hardware attestation verification application configured to: (i) read a platform certificate comprising information associated with one or more information handling resources of the information handling system recorded during creation of the platform certificate; (ii) perform hardware attestation of the information handling system by comparing information associated with the one or more information handling resources and the information stored within the platform certificate; and (iii) generate a log indicative of the results of the hardware attestation.

18 Claims, 2 Drawing Sheets

SYSTEMS AND METHODS FOR HARDWARE ATTESTATION IN AN INFORMATION HANDLING SYSTEM

TECHNICAL FIELD

The present disclosure relates in general to information handling systems, and more particularly to hardware attestation in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many consumers of information handling resources are increasingly demanding that manufacturers of information handling systems provide assurances that an information handling system ordered from the manufacturer has not been tampered with prior to receipt by the customer, or after delivery. For example, without security measures in place, an interloper (e.g., a government intelligence agency, business competitor, or other person with harmful intent) could possibly intercept an information handling system during transit, and replace hardware and software components of the information handling system with malicious components intended to mimic the replaced components while performing some malicious operation (e.g., snooping data, data corruption, or snooping of the information handling system). Furthermore, even if an information handling system is delivered to an intended end user without tampering, such tampering may also occur (e.g., by a rogue employee, individual gaining unauthorized access, or other person with harmful intent). While many approaches have been employed to ensure security of software during transit from manufacturer to intended end user, the industry still lacks an effective approach for providing such security with respect to hardware components and firmware residing on such components.

SUMMARY

In accordance with the teachings of the present disclosure, the disadvantages and problems associated with ensuring security of an information handling system may be reduced or eliminated.

In accordance with embodiments of the present disclosure, an information handling system may include a processor and a basic input/output system comprising boot firmware configured to be the first code executed by the processor when the information handling system is booted and/or powered on and execute prior to execution of an operating system of the information handling system, the basic input/output system embodied in non-transitory computer-readable media communicatively coupled to the processor and configured to, when loaded and executed by the processor, execute a hardware attestation verification application prior to execution of an operating system of the information handling system and configured to: (i) read a platform certificate comprising information associated with one or more information handling resources of the information handling system recorded during creation of the platform certificate; (ii) perform hardware attestation of the information handling system by comparing information associated with the one or more information handling resources and the information stored within the platform certificate; and (iii) generate a log indicative of the results of the hardware attestation.

In accordance with these and other embodiments of the present disclosure, a method may include, during execution of a basic input/output system comprising boot firmware configured to be the first code executed by the processor when the information handling system is booted and/or powered on and execute prior to execution of an operating system of the information handling system, executing a hardware attestation verification application configured to: (i) read a platform certificate comprising information associated with one or more information handling resources of the information handling system recorded during creation of the platform certificate; (ii) perform hardware attestation of the information handling system by comparing information associated with the one or more information handling resources and the information stored within the platform certificate; and (iii) generate a log indicative of the results of the hardware attestation.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, during execution of a basic input/output system comprising boot firmware configured to be the first code executed by the processor when the information handling system is booted and/or powered on and executed prior to execution of an operating system of the information handling system, executing a hardware attestation verification application configured to: (i) read a platform certificate comprising information associated with one or more information handling resources of the information handling system recorded during creation of the platform certificate; (ii) perform hardware attestation of the information handling system by comparing information associated with the one or more information handling resources and the information stored within the platform certificate; and (iii) generate a log indicative of the results of the hardware attestation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
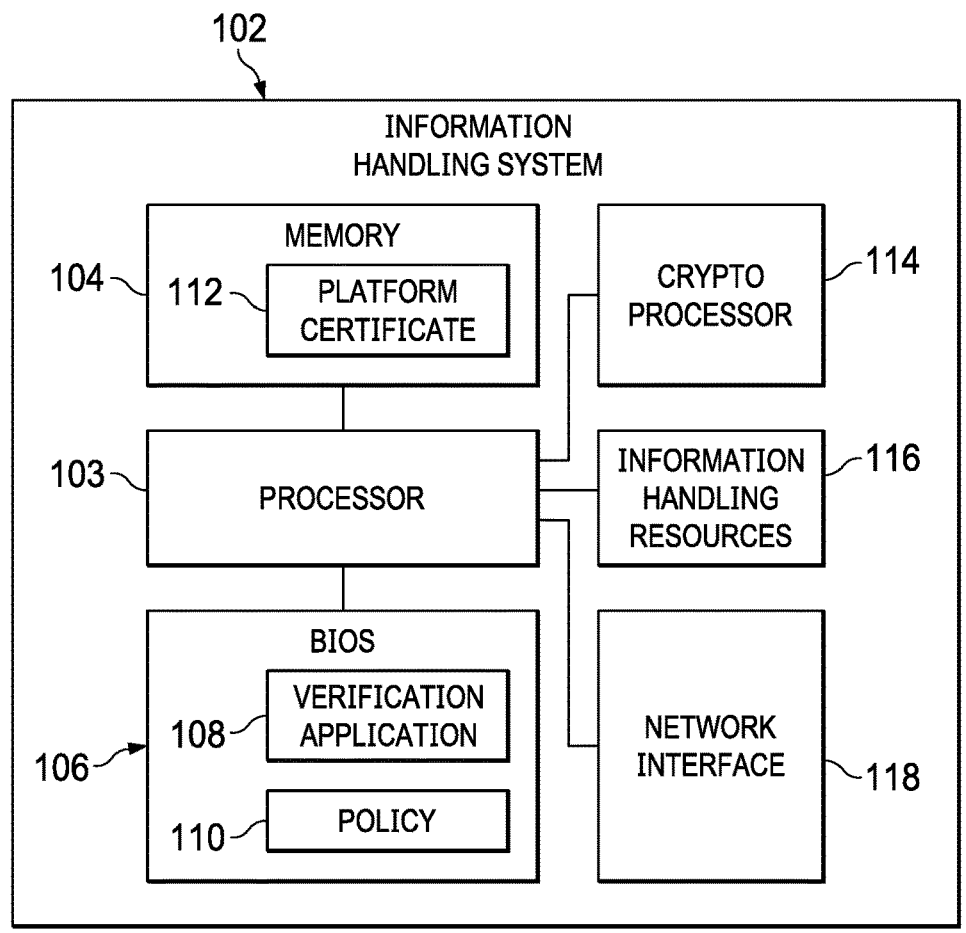
FIG. 1 illustrates a block diagram of an example information handling system, in accordance with embodiments of the present disclosure.
Figure 2:
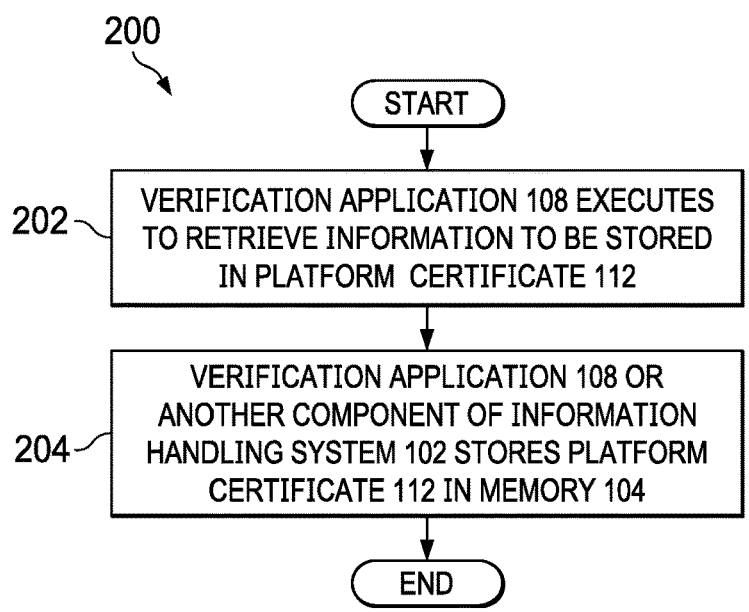
FIG. 2 illustrates a flow chart of an example method for storing a platform certificate for an information handling system, in accordance with embodiments of the present disclosure.
Figure 3:
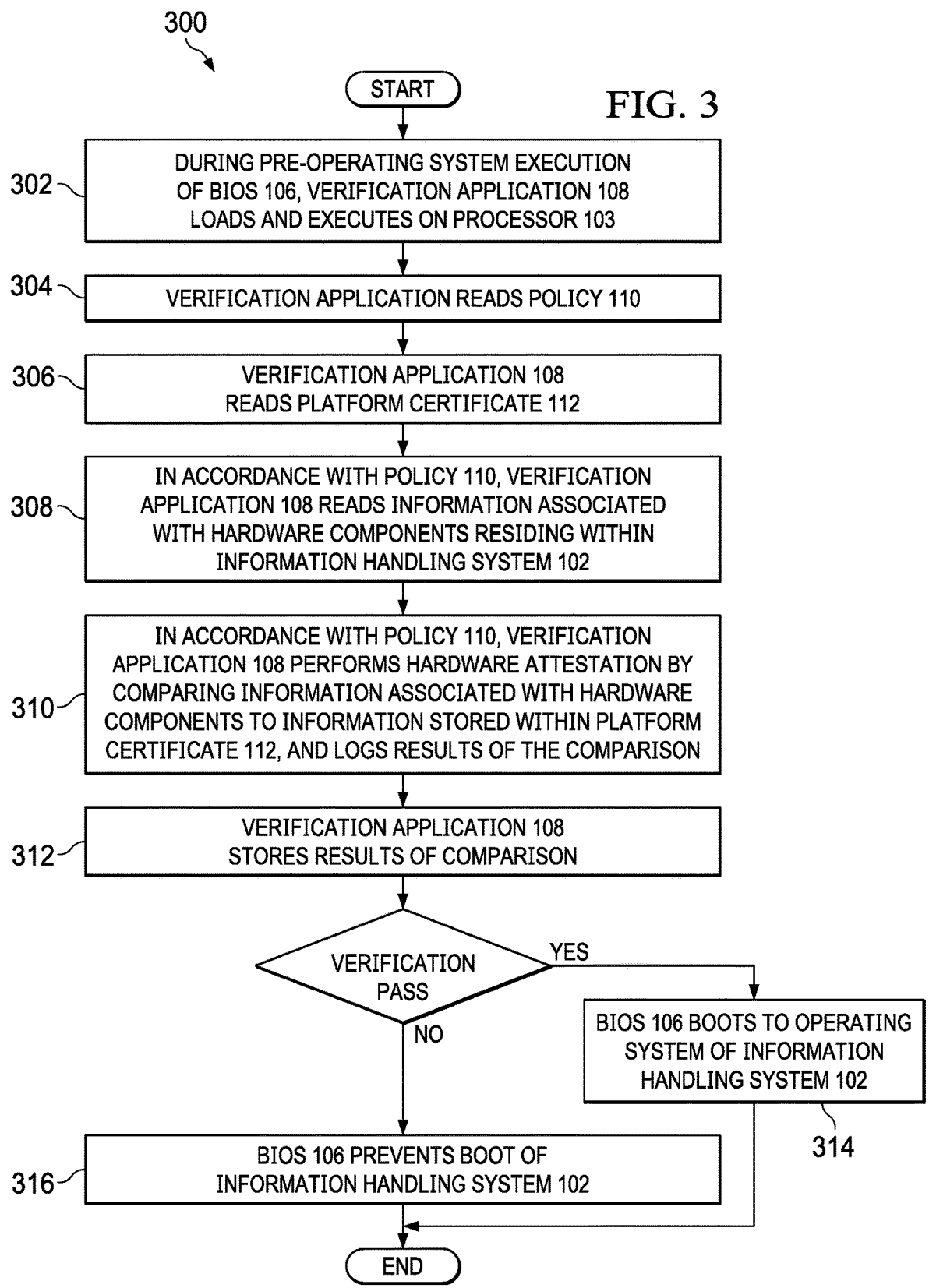
FIG. 3 illustrates a flow chart of an example method for verifying whether an information handling system has experienced tampering, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a BIOS 106 communicatively coupled to processor 103, a cryptoprocessor 114 communicatively coupled to processor 103, a network interface 118 communicatively coupled to processor 103, and one or more information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored therein a platform certificate 112 (e.g., stored in a non-volatile portion of memory 104). Platform certificate 112 may comprise any collection of data that may include identifying information of one or more components of hardware (e.g., processor 103, memory 104, network interface 118, other information handling resources 116, etc.) of information handling system 102. In some embodiments, such identifying information may include information that would be difficult for an interloper to mimic without expending significant amounts of time and/or resources. For example, platform certificate 112 may include static data which have unique and unchanging values for each information handling system 102, such as a unique identifier (e.g., serial number, service tag, version number, etc.) of information handling system 102, unique identifiers (e.g., serial numbers, version numbers, etc.) of memory modules (e.g., dual-inline memory modules) or memory 104 installed in information handling system 102 by the manufacturer, unique identifiers (e.g., media access control addresses, version numbers, etc.) of network interface cards installed in information handling system 102 by the manufacturer, and/or any other suitable uniquely identifying characteristic of processor 103, memory 104 and/or another information handling resource 116 of information handling system 102.

BIOS 106 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 102 is booted and/or powered on. As part of its initialization functionality, code for BIOS 106 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 106 may implement a verification application 108. As described in greater detail elsewhere in this disclosure, verification application 108 may include any system, device, or apparatus configured to create a platform certificate 112 for information handling system 102 during and immediately after its manufacture and before delivery to an intended end user, and/or to attest hardware of information handling system 102 to verify whether hardware of information handling system 102 has experienced tampering (e.g., during transit of the information handling system from a manufacturer to an intended end user or after delivery to the intended end user). In some embodiments, verification application 108 may be implemented as a program of instructions that may be read by and executed on processor 103 to carry out the functionality of verification application 108. Further, in some embodiments, verification application 108 may be protected by a signature with a private key maintained by a manufacturer of such component, and platform certificate 112 may include a public key provided by such manufacturer that corresponds to the private key.

Also as shown in FIG. 1, BIOS 106 may implement a policy 110. Policy 110 may include configuration parameters for hardware attestation of information handling system 102, including without limitation selectable levels of attestation (e.g., certification validation against encryption key, signing key validation, validation of some attributes, validation of all attributes, etc.) and/or frequency of attestation (every boot, one a week, one a month, etc.) in order to mitigate boot time impact of hardware attestation.

Cryptoprocessor 114 may be communicatively coupled to processor 103 and/or BIOS 106 (e.g., via a suitable communication bus) and may include any system, device, or apparatus configured to carry out cryptographic operations on data communicated to it from processor 103, BIOS 106, and/or another component of information handling system 102. In some embodiments, cryptoprocessor 114 may be compliant with the Trusted Platform Module specification, a successor specification, and/or any other similar specification. In some embodiments, cryptoprocessor 114 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

Network interface 118 may comprise any suitable system, apparatus, or device operable to serve as an interface between information handling system 102 and one or more other information handling systems via an in-band management network. Network interface 118 may enable information handling system 102 to communicate using any suitable transmission protocol and/or standard. In these and other embodiments, network interface 118 may comprise a network interface card, or "NIC."

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, verification application 108 may implement a hardware-rooted, protected, and operating system agnostic environment to verify hardware components of information handling system 102 prior to execution of the operating system and before data of information handling system 102 is exposed to a potential interloper. In particular, verification application 108 may, in accordance with policy 110, verify the identities of components of information handling system 102 against platform certificate 112 (which may be pre-installed in information handling system 102 in a secure portion of memory 104), and issue a notification in response to a failed verification.

FIG. 2 illustrates a flow chart of an example method for storing platform certificate 112 for information handling system 102, in accordance with embodiments of the present disclosure. According to one embodiment, method 200 may begin at step 202. As noted above, teachings of the present disclosure may be implemented in a variety of configurations of information handling system 102.

At step 202, once manufacture of information handling system 102 is complete (e.g., when all software and hardware components have been installed and configured according to an order of an intended end user), verification application 108 may execute (e.g., during a special-purpose boot process of information handling system 102) in order to retrieve information to be stored in platform certificate 112 and store such information (e.g., in memory 104 or another non-volatile computer-readable medium integral to or accessible by verification application 108). In some embodiments, platform certificate 112 may be bound to information handling system 102 by cryptoprocessor 114. In these and other embodiments, such information of platform certificate 112 may be signed or encrypted, such that the information may later be decrypted by verification application 108 (e.g., with a public key associated with the private key). In embodiments in which such encryption occurs, such signing may be performed by verification application 108. In other embodiments in which such encryption occurs, verification application 108 may deliver the profile information to a key management server (not shown) which signs the profile information and platform certificate 112 and delivers signed platform certificate 112 back to information handling system 102.

At step 204, verification application 108 or another component of information handling system 102 may store platform certificate 112 in memory 104. After completion of step 204, information handling system 102 may be delivered by any mix of trusted or untrusted entities prior to its final intended destination.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In transit between the manufacturer and the intended end user and/or while unattended after delivery to the intended end user, information handling system 102 is susceptible to attack from potential interlopers. Accordingly, it may be desirable to verify whether or not such an attack has occurred.

FIG. 3 illustrates a flow chart of an example method 300 for verifying whether information handling system 102 has experienced tampering, in accordance with embodiments of the present disclosure. According to one embodiment, method 300 may begin at step 302. As noted above, teachings of the present disclosure may be implemented in a variety of configurations of information handling system 102.

At step 302, during execution of BIOS 106 and before execution of an operating system on information handling system 102, verification application 108 may load and begin executing on processor 103. At step 304, verification application 108 may read policy 110. At step 306, verification application 108 may read platform certificate 112. At step 308, in accordance with policy 110, verification application 108 may read information associated with hardware components residing within information handling system 102. At step 310, in accordance with policy 110, verification application 108 may perform hardware attestation by comparing the information associated with hardware components to the information stored within platform certificate 112, and log the results of the comparison. At step 312, verification application 108 may store the results of the comparison (e.g., in a mailbox or other storage medium associated with BIOS 106).

At step 313, verification application 108 may determine if the verification has passed. If the verification has passed, method 300 may proceed to step 314. Otherwise, method 300 may proceed to step 316.

At step 314, BIOS 106 may boot to an operating system of information handling system 102. After completion of step 314, method 300 may end.

At step 316, BIOS 106 may prevent the operating system of information handling system 102 from booting. After completion of step 316, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Accordingly, upon boot of an operating system of information handling system 102, an agent application of the operating system may read the log stored by verification application 108 and, if the log indicates a verification failure, communicate an indication of such failure (e.g., via network interface 118) to a user or administrator of information handling system 102 and/or a manufacturer, vendor, or other provider of information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system including boot firmware comprising the first code executed by the processor when the information handling system is booted and/or powered on and executed prior to execution of an operating system of the information handling system, the basic input/output system embodied in non-transitory computer-readable media communicatively coupled to the processor and configured, when loaded and executed by the processor, to execute a hardware attestation verification application prior to execution of an operating system of the information handling system wherein the hardware attestation verification application, when executed, performs operations including:
      reading a platform certificate comprising identifying information associated with one or more hardware resources of the information handling system recorded during creation of the platform certificate;
      comparing the identifying information associated with the one or more hardware resources and the information stored within the platform certificate; and
      generating a log indicative of the comparing.

2. The information handling system of claim 1, wherein the hardware attestation verification application performs the operations in accordance with a hardware attestation policy wherein the hardware attestation policy includes configuration parameters indicative of at least one of:
   one of a plurality of selectable levels of attestation; and
   a frequency parameter indicative of how often the operations are performed.

3. The information handling system of claim 2, wherein the plurality of selectable levels of attestation include:
   a first level for performing attestation of each of the one or more hardware resources; and
   a second level for performing attestation of less than all of the one or more hardware resources.

4. The information handling system of claim 1, wherein the platform certificate is created by a manufacturer of the information handling system prior to delivery of the information handling system to its intended end user.

5. The information handling system of claim 1, wherein the information handling system comprises a cryptoprocessor and the platform certificate is bound to the information handling system by the cryptoprocessor.

6. The information handling system of claim 1, wherein the platform certificate is cryptographically signed with a signature and the hardware attestation verification application is configured to verify the signature when performing hardware attestation.

7. A method comprising, during execution of a basic input/output system comprising boot firmware configured to be the first code executed by the processor when the information handling system is booted and/or powered on and execute prior to execution of an operating system of the information handling system, executing a hardware attestation verification application configured to perform operations including:
   reading a platform certificate comprising identifying information associated with one or more hardware resources of the information handling system recorded during creation of the platform certificate;
   comparing the identifying information associated with the one or more hardware resources and the information stored within the platform certificate; and
   generating a log indicative of the results of the comparing.

8. The method of claim 7, wherein the hardware attestation verification application performs the operations in accordance with a hardware attestation policy wherein the hardware attestation policy includes configuration parameters indicative of at least one of:
   one of a plurality of selectable levels of attestation; and
   a frequency parameter indicative of how often the operations are performed.

9. The method of claim 8, wherein the plurality of selectable levels of attestation include:
   a first level for performing attestation of each of the one or more hardware resources; and
   a second level for performing attestation of less than all of the one or more hardware resources.

10. The method of claim 7, wherein the platform certificate is created by a manufacturer of the information handling system prior to delivery of the information handling system to its intended end user.

11. The method of claim 7, wherein the information handling system comprises a cryptoprocessor and the platform certificate is bound to the information handling system by the cryptoprocessor.

12. The method of claim 7, wherein the platform certificate is cryptographically signed with a signature and the hardware attestation verification application is configured to verify the signature when performing hardware attestation.

13. An article of manufacture comprising:
   a non-transitory computer readable medium; and
   computer-executable instructions carried on the computer readable medium, the instructions readable by a processor, the instructions, when read and executed, for causing the processor to, during execution of a basic input/output system comprising boot firmware configured to be the first code executed by the processor when the information handling system is booted and/or powered on and executed prior to execution of an operating system of the information handling system, executing a hardware attestation verification application configured to perform operations including:
      reading a platform certificate comprising identifying information associated with one or more hardware resources of the information handling system recorded during creation of the platform certificate;
      comparing the identifying information associated with the one or more hardware resources and the information stored within the platform certificate; and
      generating a log indicative of the results of the comparing.

14. The article of claim 13, wherein the hardware attestation verification application performs the operations in accordance with a hardware attestation policy wherein the hardware attestation policy includes configuration parameters indicative of at least one of:
   one of a plurality of selectable levels of attestation; and
   a frequency parameter indicative of how often the operations are performed.

15. The article of claim 14, wherein the plurality of selectable levels of attestation include:
   a first level for performing attestation of each of the one or more hardware resources; and
   a second level for performing attestation of less than all of the one or more hardware resources.

16. The article of claim 13, wherein the platform certificate is created by a manufacturer of the information handling system prior to delivery of the information handling system to its intended end user.

17. The article of claim 13, wherein the information handling system comprises a cryptoprocessor and the platform certificate is bound to the information handling system by the cryptoprocessor.

18. The article of claim 13, wherein the platform certificate is cryptographically signed with a signature and the hardware attestation verification application is configured to verify the signature when performing hardware attestation.

* * * * *